E. R. PACKER.
TIRE HOLDER.
APPLICATION FILED DEC. 2, 1915.

1,306,712.

Patented June 17, 1919.
2 SHEETS—SHEET 1.

Witness:
Harry S. Guillu

Inventor
Eben R. Packer,
By Chamberlin Freudenreich,
attys

E. R. PACKER.
TIRE HOLDER.
APPLICATION FILED DEC. 2, 1915.

1,306,712.

Patented June 17, 1919.
2 SHEETS—SHEET 2.

Witness:
Harry S. Gaither

Inventor
Eben R. Packer,
By Chamberlin & Freudenreich
attys.

UNITED STATES PATENT OFFICE.

EBEN R. PACKER, OF WILMETTE, ILLINOIS, ASSIGNOR TO PACKER AUTO SPECIALTY COMPANY, OF CHICAGO, ILLINOIS, A CORPORATION OF ILLINOIS.

TIRE-HOLDER.

1,306,712.     Specification of Letters Patent.     Patented June 17, 1919.

Application filed December 2, 1915. Serial No. 64,617.

*To all whom it may concern:*

Be it known that I, EBEN R. PACKER, a citizen of the United States, residing at Wilmette, county of Cook, State of Illinois, have invented a certain new and useful Improvement in Tire-Holders, and declare the following to be a full, clear, and exact description of the same, such as will enable others skilled in the act to which it pertains to make and use the same, reference being had to the accompanying drawings, which form a part of this specification.

My invention has for its object to produce a light, simple and efficient device for holding a spare automobile tire in such a way that moisture and dirt are excluded from the interior thereof.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 6:
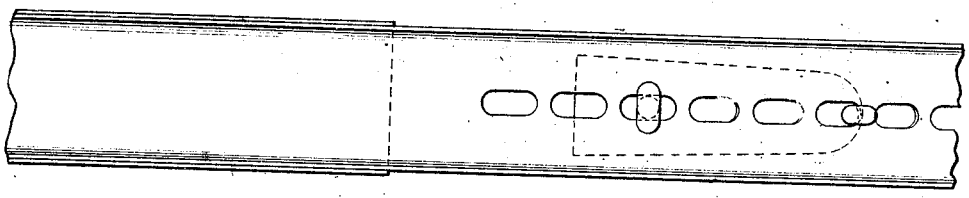
Figure 7:
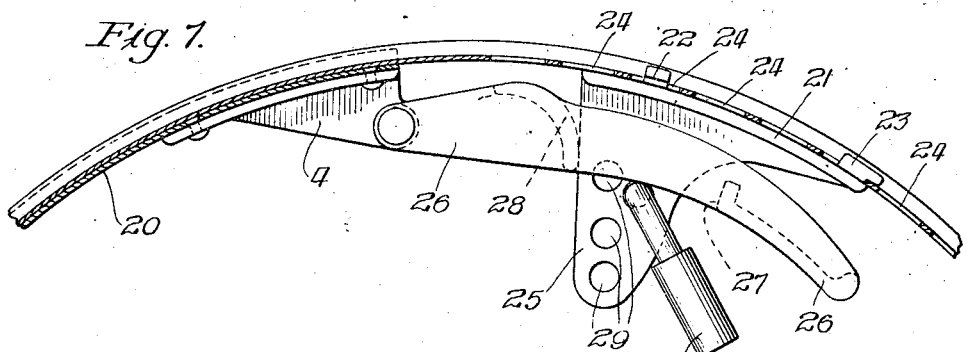
Figure 8:
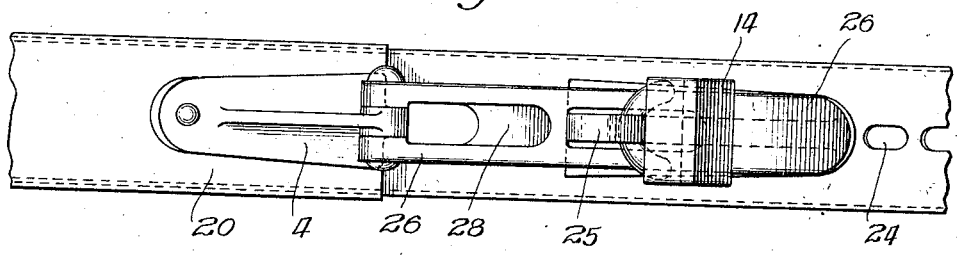

Fig. 6. is a top plan view of a fragment of a modified form of device;

Fig. 7 is a view of the device shown in Fig. 6, showing the rim member in section and the clamping or holding parts in side elevation;

Fig. 8 is a bottom plan view of the parts shown in Figs. 6 and 7.

Referring to Figs. 1 to 5 of the drawings, 1 represents a ring-like shallow trough preferably of sheet metal and made of a strip bent into shape and having its ends overlapping a considerable distance when the ring has the diameter of a rim to fit within the tire to be supported. At suitable points on the member 1 conveniently diametrically opposed to each other are devices, 2, for supporting it from some part of an automobile. When it is desired to place a tire upon the holder the ring is contracted in any suitable way so as to permit it to be placed easily within the tire, and it is then expanded firmly against the tire which is therefore held tightly in the trough just as it is held on the rim of a wheel to which it may be applied, forming a seal between the free edges of the tire and effectively preventing the entrance of moisture or dirt.

Figure 1:
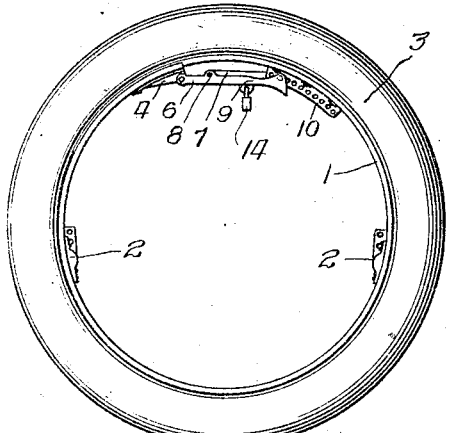
Figure 1 is a front elevation of a device arranged in accordance with a preferred form of my invention, having thereon a tire.
Figure 2:
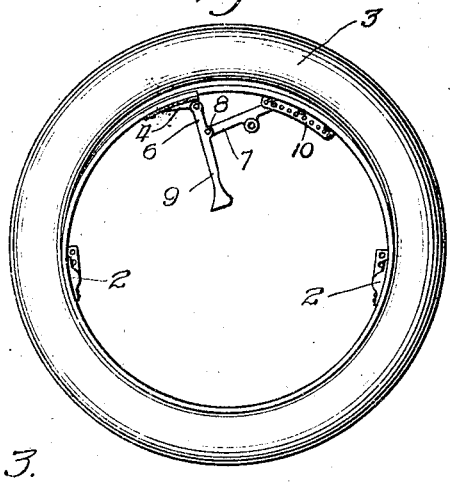
Fig. 2 is a view similar to Fig. 1 showing the holder in position to permit the tire to be removed.
Figure 3:
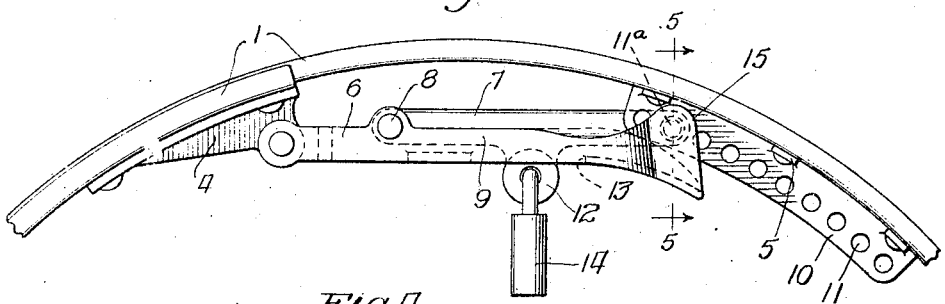
Fig. 3 is a side view on an enlarged scale of a fragment of the holder, the parts being in the positions indicated in Fig. 1.
Figure 4:
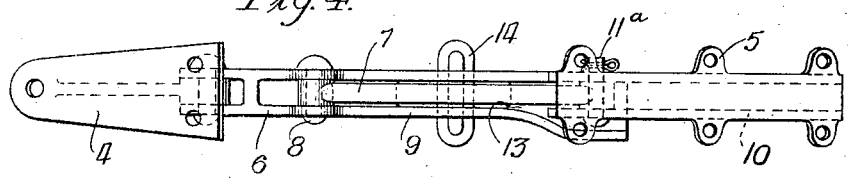
Fig. 4 is a top plan view of the parts shown in Fig. 3 with the rim part omitted.
Figure 5:
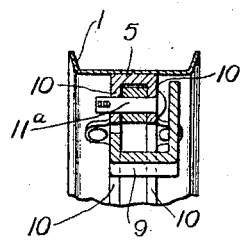
Fig. 5 is a section approximately on line 5—5 of Fig. 3.

In the construction under consideration the contraction and expansion of the holder take place in the upper half, the overlap between the two ends of the holder being at the top so as to leave the lower half jointless and thus prevent the possibility of water collecting at a joint and seeping through. A bracket, 4, is secured on the inner side of the holder at the end which is the inner of the two overlapped ends, that is the end nearest the center of the wheel. On the inner side of the holder at a considerable distance removed from the other end is secured a bracket, 5, which will be spaced apart from the bracket 4 when the holder is contracted to the smallest size necessary to permit the removal of a tire or the placing of a tire on the holder. Between the brackets 4 and 5 is a toggle consisting of two links, 6 and 7, hinged at their outer ends to the brackets 4 and 5, respectively, and pivotally connected together at their inner ends, as indicated at 8. The link 6 is continued past the pivotal point, 8, so as to form a long lever or arm, 9, which is preferably longer than the link 7 so that when the toggle is straightened, the member 9 lies beside the member 7 and extends from one end to the other of the latter. It will be seen that when the lever 9 is drawn down so as to bring the links 6 and 7 at an angle to each other, the upper half of the holder is contracted as indicated in Fig. 2. While the holder is in this condition a tire may be removed from or placed on the holder. When the tire is on the holder the lever is swung up to the position indicated in Figs. 1 and 3, straightening the toggle and expanding the upper half of the holder so as to make the holder bear tightly against the tire at all points. In order to make provision for variations in the size of tires, the point of attachment of one of the links with the holder may be made adjustable. In the arrangement shown, the bracket, 5, is provided with a pair of long parallel ribs, 10, extending in the circumferential direction, the ribs being provided with a series of circumferentially distributed registering openings, 11. The end of the link 7 lies between the ribs 10 and is pivotally secured thereto by means of a headed pin, 11ª, extending through the same and through any two of the registering openings, 11. This construction permits the link 7 to be attached at any one of a series of circumferentially distributed points on the holder.

The arm or lever 9 is preferably made L-shaped in cross section so that one of its flanges will lie on the front side of the link 7 while its other flange will lie underneath this link when the holder is in its expanded position. This permits the holder to be locked in its expanded position and the tire to be locked on the holder by simply providing the link 7 with a perforated ear, 12, which will project through a suitable opening 13, in the underlying portion of the lever; a lock, 14, being placed on the ear and preventing it from being withdrawn. The free end, 15, of the front flange of the lever lies in front of the pivot pin, 11, so that when the holder is locked in its expanded or holding position, the pin, 11, cannot be removed, thus permitting the use of the quick detachable pin for the purpose of securing a quick adjustment of the toggle, without danger that the tire will be lost or stolen because of the removal of this pin when the tire is in place.

In Figs. 6 and 7 I have shown another fastening device which, like the one heretofore described, permits the holder to be expanded and contracted quickly and conveniently. The rim or ring, 20, is the same as the member 1 and has attached thereto a bracket, 4, similar to the bracket 4 in the other form. Instead of the bracket, 5, I have provided a bracket, 21, having on the upper side suitably headed or notched projections, 22 and 23, adapted to pass through two of a series of openings 24, in the holder so as to permit it to be adjusted from and toward the bracket, 4, by simply withdrawing the projections, 22 and 23, from the openings in which they happen to be and inserting them in other openings. On the bracket, 21, is a downwardly-projecting ear, 25. On the bracket 4 is hinged a lever 26, having an opening, 27, through which the ear 25 is adapted to pass. The edge of the opening, 27, on the side nearest the pivotal axis of the lever is made in the form of a cam, 28, so shaped that when the lever is swung upwardly or outwardly, the cam engages with the adjacent edge of the ear 25 and forces the ear circumferentially away from the bracket, 4; thus securing an expansion of the holder as in the case of the toggle in the arrangement previously described. The ear, 25, is provided with a series of distributed openings, 29, through any one of which the shackle of a suitable lock, 14, may be passed. This series of holes provides a certain amount of adjustment without shifting the position of the bracket, 21, because they render it unnecessary to swing the lever, 26, at all times to its fully closed position.

I claim:

1. A holder comprising a strip bent into the form of a ring having its end portions arranged to be relatively movable for expanding and contracting the ring, toggle-links pivotally connected to the adjacent end portions of the ring and to each other and the pivotal connecting means at one point being shiftable to vary the length of the long arc of the ring when extended, and a portion of one of said toggle links being formed to overlie the shiftable connecting means when in expanding position, substantially as described.

2. A holder comprising a strip bent into the form of a ring having its end portions arranged to be relatively movable for expanding and contracting the rings, toggle links pivotally connected to the adjacent end portions of the ring and to each other, the pivotal connecting means at one point being shiftable to vary the length of the long arc of the ring when expanded, one of said links having a lever extension and a portion of one of said links being formed to overlie the shiftable connecting means when in expanded position, and means to lock the parts in expanding position, substantially as described.

3. A holder comprising a strip bent into the form of a ring having its ends overlapping, a quick-acting expanding and contracting device arranged between the end on the inner side of the ring and an adjacent portion on the other end, and means for shifting the point at which said device is attached to one of said ends circumferentially.

4. A holder comprising a strip bent into the form of a ring having its ends overlapping, a quick-acting expanding and contracting device arranged between the end on the inner side of the ring and an adjacent portion on the other end, and means for varying the length of the long arc of the ring subtended by said device.

5. A holder comprising a strip bent into the form of a ring having its ends overlapping, two brackets connected respectively to the end on the inner side of the ring and to an adjacent portion on the other end, one of said brackets having a plurality of holes distributed in the circumferential direction thereon, a toggle having one end connected to the latter bracket by a pin passing through any one of said openings and having its other end connected to the other bracket.

6. A holder comprising a strip bent into the form of a ring having its ends overlapping, two brackets connected respectively to the end on the inner side of the ring and to an adjacent portion on the other end, one of said brackets having a plurality of holes distributed in the circumferential direction thereon, a toggle having one end connected to the latter bracket by a pin passing through any one of said openings and having its other end connected to the other bracket, and an arm forming a continuation of one of the members of said toggle and adapted to lie in front of said pin when the toggle is straightened.

7. A holder comprising a strip bent into the form of a ring having its end portions arranged to be relatively movable for expanding and contracting of the ring, a quick acting expanding and contracting device arranged between and connected to the adjacent end portions of the ring and means for shifting the connection of said device to the ring at one side circumferentially to vary the length of the long arc of the ring when expanded by said device and a portion of said expanding and contracting device being arranged to overlie the said shiftable connection to prevent its removal when the parts are in expanding position and means for locking said device in expanding position substantially as described.

8. A holder comprising a strip bent into the form of a ring having its end portions arranged to be relatively movable for expanding and contracting the ring, two brackets connected respectively to the adjacent end portions of the ring, one of said brackets having a plurality of holes distributed in the circumferential direction thereon, a toggle having one end connected to the latter bracket by a shiftable pin passing through any one of said openings and its other end connected to the other bracket substantially as described.

9. A holder comprising a strip bent into the form of a ring having its end portions arranged to be relatively movable for expanding and contracting the ring, two brackets connected respectively to the adjacent end portions of the ring, one of said brackets having a plurality of holes distributed in the circumferential direction thereon, a toggle having one end connected to the latter bracket by a shiftable pin passing through any one of said openings and its other end connected to the other bracket, said toggle being formed whereby a portion thereof overlies the shiftable pin when in expanding position and means to lock the parts in expanded position substantially as described.

10. A holder of the character described comprising a strip bent into the form of a ring having its end portions arranged to be relatively movable for expanding and contracting the ring, two brackets connected respectively to the adjacent end portions of the ring, one of said brackets having a plurality of holes distributed in the circumferential direction thereon, a toggle having one end connected to the latter bracket by a shiftable pin passing through any one of said openings and having its other end connected to the other bracket, a lever extension formed on one of the toggle links and adapted to overlie the shiftable pin when in expanded position to prevent the removal thereof, one of the toggle links being formed with an opening therethrough, an eyelet extension formed on the other of said toggle links and adapted to extend through said openings when in expanding position whereby the parts may be locked in expanded position.

In testimony whereof, I sign this specification.

EBEN R. PACKER.